(12) United States Patent
Rouphael et al.

(10) Patent No.: US 7,272,169 B2
(45) Date of Patent: Sep. 18, 2007

(54) REVERSE LINK CORRELATION FILTER IN WIRELESS COMMUNICATION SYSTEMS

(75) Inventors: Antoine J. Rouphael, Melbourne, FL (US); John E. Hoffmann, Indialantic, FL (US); George Rodney Nelson, Jr., Merrit Island, FL (US); Samir K. Patel, Melbourne Beach, FL (US); James A. Proctor, Jr., Indialantic, FL (US); Daniel I. Riley, West Melbourne, FL (US)

(73) Assignee: IPR Licensing, Inc., Wilmington, DE (US)

( * ) Notice: Subject to any disclaimer, the term of this patent is extended or adjusted under 35 U.S.C. 154(b) by 0 days.

(21) Appl. No.: 10/957,928

(22) Filed: Oct. 4, 2004

(65) Prior Publication Data

US 2005/0041726 A1 Feb. 24, 2005

Related U.S. Application Data

(63) Continuation of application No. 09/738,934, filed on Dec. 15, 2000, now Pat. No. 6,801,564.

(60) Provisional application No. 60/184,364, filed on Feb. 23, 2000.

(51) Int. Cl.
 *H04B 1/00* (2006.01)
(52) U.S. Cl. ........................ 375/150; 375/142
(58) Field of Classification Search ........ 375/130, 375/150, 140–143, 267, 152, 279–281, 347, 375/329, 332, 343, 225; 370/320, 335, 342, 370/441

See application file for complete search history.

(56) References Cited

U.S. PATENT DOCUMENTS 4,675,839 A   6/1987 Kerr (Continued)

FOREIGN PATENT DOCUMENTS

EP    1 039 653 A2    9/2000
FR    2 629 931 A1    10/1989

OTHER PUBLICATIONS

Schramm, et al., IEEE Transactions on Communications, 46(12): 1560-1563, Dec. 1998.

(Continued)

*Primary Examiner*—Jean B. Corrielus
(74) *Attorney, Agent, or Firm*—Volpe and Koenig, P.C.

(57) ABSTRACT

A single, common correlation filter (CF) core is provided in a wireless system using CDMA. A plurality of channels with different data rates are provided in the wireless system. The channels provided in the wireless system include the access channel, the maintenance channel, and the traffic channel in which information (e.g., pilot or data symbols or both) is transmitted at the tier 1, tier 2 and tier 3 rates. The data rate for transmitting the information is programmable by digital signal processor (DSP). A user-unique code, such as a PN code, is applied to the information being transmitted in the channels of the wireless system. The information is QPSK modulated and transmitted in any one of the channels at any data rate. The transmitted information is correlated at the smallest data rate (i.e., the tier 1 rate) in the correlation filter (CF) of the wireless system by time multiplexing delayed versions of the PN code to the correlation filter core. The correlated information is then demultiplexed and pilot aided QPSK demodulated. The demodulated information is summed at the proper integer multiple of the tier 1 rate to achieve the tier 2 and tier 3 rates. The three strongest multipaths (in terms of the received power) are selected in a window or time period for optimal information recovery. Furthermore, three outputs from the demodulated information can be provided and combined for temporal diversity. Spatial diversity is achieved by providing a plurality of antennas at each receiver and a single, common correlation filter at each of the plurality of antennas of the receivers in the wireless system.

47 Claims, 13 Drawing Sheets

U.S. PATENT DOCUMENTS

| | | | |
|---|---|---|---|
| 5,329,547 A | 7/1994 | Ling | |
| 5,513,216 A | 4/1996 | Gadot et al. | |
| 5,619,524 A | 4/1997 | Ling et al. | |
| 5,659,573 A * | 8/1997 | Bruckert et al. | 375/142 |
| 5,856,971 A | 1/1999 | Gitlin et al. | |
| 5,920,551 A | 7/1999 | Na et al. | |
| 5,946,344 A | 8/1999 | Warren et al. | |
| 5,949,833 A | 9/1999 | Weerackody | |
| 5,991,332 A | 11/1999 | Lomp et al. | |
| 6,005,887 A | 12/1999 | Bottomley et al. | |
| 6,125,136 A | 9/2000 | Jones et al. | |
| 6,157,687 A * | 12/2000 | Ono | 375/347 |
| 6,215,813 B1 | 4/2001 | Jones et al. | |
| 6,229,842 B1 * | 5/2001 | Schulist et al. | 375/148 |
| 6,233,271 B1 | 5/2001 | Jones et al. | |
| 6,331,998 B1 * | 12/2001 | Lin et al. | 375/143 |
| 6,430,166 B1 * | 8/2002 | Bejjani et al. | 370/320 |
| 6,496,494 B1 * | 12/2002 | Perrin et al. | 370/335 |
| 6,507,605 B1 * | 1/2003 | Fukumoto et al. | 375/152 |

OTHER PUBLICATIONS

Schramm, et al., IEEE Transactions on Communications, 46(9): 1122-1124, Sep. 1998.

Schramm, et al., IEEE Transactions on Communications, 45(10): 1327-1337, Oct. 1997.

* cited by examiner

FIG. 6A

| Tier 1 symbol # | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Data Type | P | D | D | D | D | D | D | D | P | D | D | D | D | D | D | D |
| AFRAM α | α | 0 | 0 | 0 | 0 | 0 | 0 | 0 | α | 0 | 0 | 0 | 0 | 0 | 0 | 0 |
| AFRAM β | β | 1 | 1 | 1 | 1 | 1 | 0 | 1 | β | 1 | 1 | 1 | 1 | 1 | 1 | 1 |
| MAFRAM α | 1 | 1 | 0 | 0 | 0 | 1 | 0 | 1 | 1 | 1 | 1 | 1 | 1 | 1 | 1 | 1 |
| MAFRAM β | 0 | 0 | 0 | 0 | 0 | 0 | 0 | 0 | 0 | 0 | 0 | 0 | 0 | 0 | 0 | 0 |

Tier 1 Pilot and Data Pattern with Corresponding AFRAM and MAFRAM Filter settings.

| Tier 1 symbol # | 1 | 2 | 3 | 4 | 5 | 6 | 7 | 8 |
|---|---|---|---|---|---|---|---|---|
| Data Type | P | P | P | P | D | D | D | D |
| AFRAM α | α | α | α | α | 0 | 0 | 0 | 0 |
| AFRAM β | β | 1 | 1 | 1 | 1 | 1 | 1 | 1 |
| MAFRAM α | 1 | 1 | 1 | 1 | 1 | 1 | 1 | 1 |
| MAFRAM β | 0 | 0 | 0 | 0 | 0 | 0 | 0 | 0 |

| Tier 1 symbol # | 62 | 63 | 64 | 65 | 66 | 67 | 68 | 69 |
|---|---|---|---|---|---|---|---|---|
| Data Type | D | D | P | P | P | P | D | D |
| AFRAM α | 0 | 0 | α | α | α | α | 0 | 0 |
| AFRAM β | 1 | 1 | β | 1 | 1 | 1 | 1 | 1 |
| MAFRAM α | 1 | 1 | 1 | 1 | 1 | 1 | 1 | 1 |
| MAFRAM β | 0 | 0 | 0 | 0 | 0 | 0 | 0 | 0 |

FIG. 6B

Tier 2 Pilot and Data Pattern with Corresponding AFRAM and MAFRAM Filter settings.

| Tier 1 symbol # | 1 | 2 | 3 |
|---|---|---|---|
| Data Type | P | P | P |
| AFRAM α | α | α | α |
| AFRAM β | β | 1 | 1 |
| MAFRAM α | 1 | 1 | 1 |
| MAFRAM β | 0 | 0 | 0 |

| 1 4 | 1 5 | 1 6 | 1 7 |
|---|---|---|---|
| P | P | P | D |
| α | α | α | 0 |
| 1 | 1 | 1 | 1 |
| 1 | 1 | 1 | 1 |
| 0 | 0 | 0 | 0 |

| 2 5 5 | 2 5 6 | 2 5 7 | 2 5 8 |
|---|---|---|---|
| D | P | P | P |
| 0 | α | α | α |
| 1 | β | 1 | 1 |
| 1 | 1 | 1 | 1 |
| 0 | 0 | 0 | 0 |

| 2 7 1 | 2 7 2 | 2 7 3 |
|---|---|---|
| P | P | D |
| α | α | 0 |
| 1 | 1 | 1 |
| 1 | 1 | 1 |
| 0 | 0 | 0 |

Tier 3 Pilot and Data Pattern with Corresponding AFRAM and MAFRAM Filter settings.

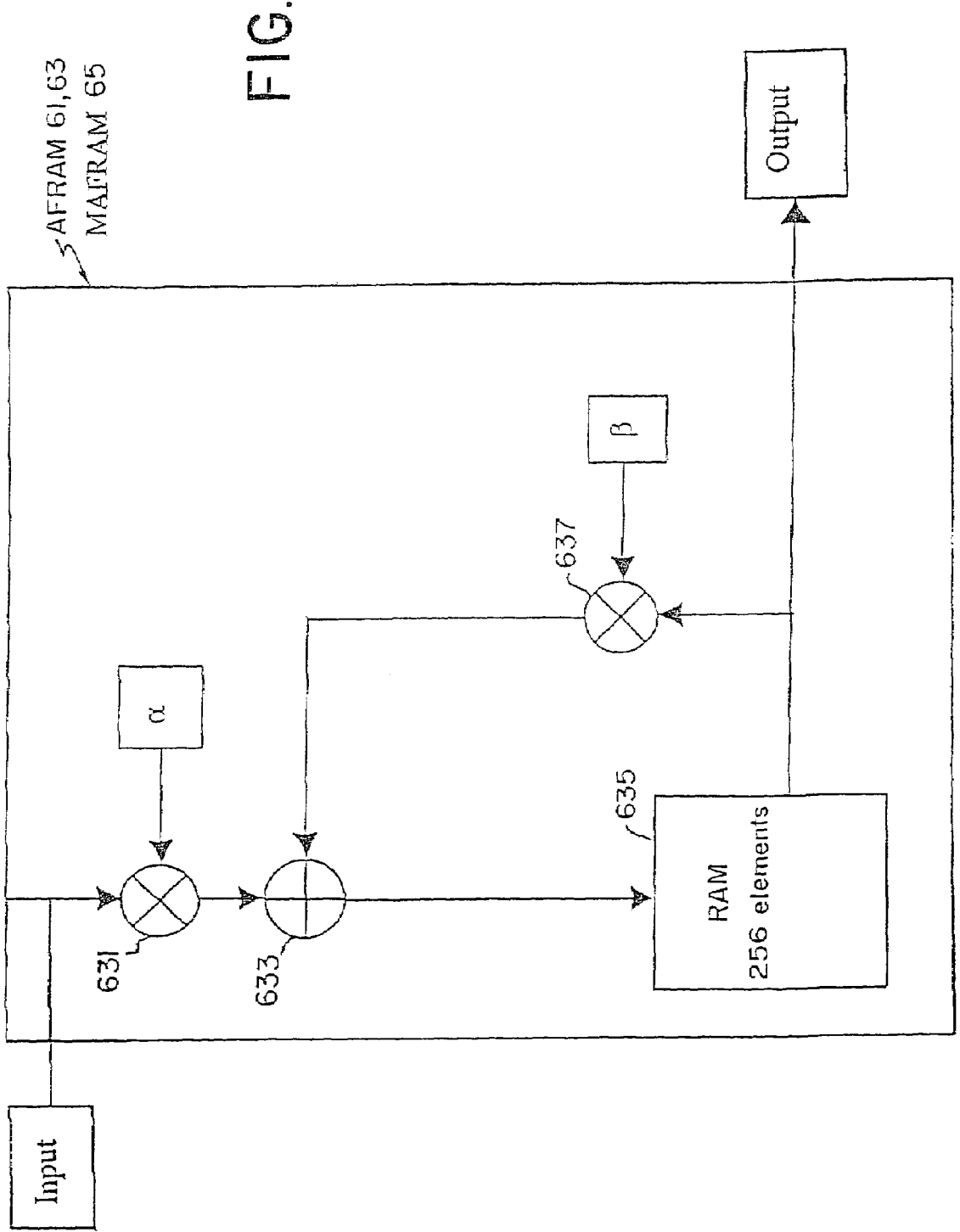

REVERSE LINK CORRELATION FILTER IN WIRELESS COMMUNICATION SYSTEMS

RELATED APPLICATIONS

This application is a continuation of U.S. application Ser. No. 09/738,934, filed Dec. 15, 2000, now U.S. Pat. No. 6,801,564, which claims the benefit of U.S. Provisional Application No. 60/184,364, filed Feb. 23, 2000. The entire teachings of the above applications are incorporated herein by reference.

FIELD OF THE INVENTION

The present invention relates to a code division multiple access (CDMA) communication system and, more particularly to a receiver having a correlation filter in such a CDMA communication system.

DESCRIPTION OF THE RELATED ART

Code Division Multiple Access (CDMA) modulation, which is known in the art, is a multi-user access transmission scheme in which signals from different users overlap both in frequency and in time. This is in contrast to Frequency Division Multiple Access (FDMA), also known in the art, in which user signals overlap in time, but are assigned unique frequencies, and Time Division Multiple Access (TDMA) in which user signals overlap in frequency, but are assigned unique time slots. CDMA signaling is frequently used in cellular communication systems between a base station (BS) within a cell and a plurality of mobile stations (MS) in the possession of users within the cell. The CDMA transmitted signal for each user that broadcast from the user's mobile station (MS) is spread over a wide bandwidth, which is greater than the initial user information bandwidth. Each user's signal is spread by a different spreading code to create a wideband spread. All of the spread wideband signals transmitted by the different users are received at the base station (BS) and form a composite received signal. The receiver at the base station (BS) distinguishes different users by using a local copy (or local reference) of the spreading code, which is available to both the mobile stations and the base station in the CDMA system. Such a process is called channelization. In an exemplary CDMA system according to the IS-95 standard and which is well known in the art, channelization in the reverse link, i.e., when a mobile station (MS) is transmitting to a base station (BS) in the system, is accomplished using a wideband code called a pseudorandom noise (PN) code, also known in the art. The receiver at the base station (BS) sifts the desired signal from a particular user out of the composite signal by correlating, i.e., using a correlation filter (CF), on the composite signal with the original wideband code. All other signals having codes that do not match the code for the desired user code are rejected.

An exemplary CDMA wireless system includes a plurality of data channels, e.g., the access and traffic channels (and more channels depending on the design of the CDMA system). In the reverse link, the traffic channel is used to transmit user data and voice, as well as signaling messages. The access channel is used by the mobile station (MS). e.g., a cellular phone, to communicate control information with the base station (BS) in the wireless system when the MS does not have a traffic channel assigned. In particular, the MS uses the access channel to make call originations and to respond to pages and orders. These data channels in the CDMA system have different functions and data rates. A receiver in the MS designed to accommodate data transmission in the different channels requires various types of correlation filter (CF) and digital signal processing (DSP) designs for different data rates. Such requirements contribute to the complexity and increase the-cost of the receiver design.

There is, therefore, a general need in the art for a wireless system with a flexible, non-complex receiver design. A wireless system is particularly needed that provides a single correlation filter (CF) in the receiver which can be used in receiving data in all data channels. There is a further need for a receiver design with a correlation filter that serves all data channels and is also DSP programmable, which enhances system flexibility.

SUMMARY OF THE INVENTION

The invention relates to a reverse link receiver in wireless systems and a correlation filter thereof. A transmitter and a receiver are provided in the reverse link of a wireless system according to the invention. The receiver includes (1) a field programmable gate array (FPGA) which comprises a pseudorandom noise (PN) code generator, (2) a pilot post processor, (3) a data post processor (4) a correlation filter (CF), and (5) a digital signal processor (DSP). The field programmable gate array (FPGA) and the correlation filter (CF), along with the digital signal processor (DSP), are included in the receiver to recover the original data transmitted by the transmitter. The correlation filter (CF) comprises a (correlating filter) CF core for processing data in the three channels, namely the access, maintenance and traffic channels. The DSP is used to control and post-process the outputs of the field programmable gate array FPGA. A mode controller in the DSP controls the channel selection (from the access, maintenance and traffic channels) and the channel symbol mode (data and/or pilot). The pilot post processor and data post processor in the FPGA, in conjunction with the DSP, provide pilot symbol aided QPSK demodulation of up to 3 multipaths received at the receiver. QPSK modulation is a modulation technique that allows the transmission of two bits of information in each symbol period. QPSK modulation makes use of the quadrature component I in addition to the in-phase component Q of a symbol in the frame being transmitted from the transmitter to the receiver. The I and Q components are typically viewed as the real and imaginary parts of a complex signal being transmitted in the channels of the CDMA system. In QPSK, the in-phase component, I, and the quadrature component, Q, can be combined without interfering with each other (i.e., they are orthogonal to each other) which doubles the bandwidth efficiency in comparison with simply transmitting one bit of information in a symbol period. Using time multiplexing, the CF core provides pilot symbol correlation at the three data or chip rates (tiers 1, 2 and 3). A chip is a unit of time which corresponds to the output interval of the PN spreading code. The chip time determines the bandwidth of the CDMA waveform and the chip time divided by the user symbol time determines the spreading factor of the system. For example, the sampling period for a chip in CDMA standard IS-95, known in the art, is seconds. The pilot post processing and data post processing in the FPGA, in conjunction with the data post processor and pilot post processor in the DSP, provide QPSK demodulation and recovery of the original data transmitted by the transmitter for all three channels, i.e., the access, maintenance and traffic channels. The CF core according to the invention performs 8-chip (i.e., tier 1 rate) complex correlation with 64 correlation lags while allowing no data loss as the 64 correlation lags are being processed, where a lag is a time instant for which the PN code is held constant so that outputs can be generated. This is advantageously achieved with a single time-multiplexed 8-chip correlator engine (i.e., CF core). The CF core, which is an 8-chip correlation engine, is time multiplexed to allow multiple 8-chip correlations to be performed with the same correlation engine. Furthermore, the invention advantageously provides the ability to generate integer multiples of the 8-chip correlation for larger correlation lengths, e.g., 32 chips (tier 2) or 128 chips (tier 3). The CF design according to the invention, in conjunction with the DSP, provides temporal diversity of the data signals by combining CF outputs. Spatial diversity is also achieved by providing a plurality of correlation filters in accordance with the CF design of the invention. Diversity is a technique employed to avoid or mitigate the negative effects of fading and interference. Diversity generally refers to the ability of a communication system to receive data or information via several independently fading channels. In general, diversity enhances a receiver's ability to combine or select (or both) data signals arriving from these independently fading channels, thereby enabling (or facilitating) the extraction of data channels. A particular type of diversity is temporal or time diversity, where the same data signals transmitted in different multipaths and received at different time points at the receiver provide the diversity needed for combining or selecting the data signals. An exemplary diversity technique is maximum ratio combining, or MRC, is known in the art. MRC provides sequences of weights in the multitude of data channels in the communication system. A sequence of distinct weights is assigned to segments of a data signal being transmitted. Copies of the data signal are produced for the antennas used in transmitting the data signal. This gives rise to temporal diversity at the receiver when copies of the data signal are received. With a single, common correlation filter design, the invention advantageously provides temporal diversity for all the data channels and modes without the necessity of using different correlation filters for the different modes or channels. Temporal diversity is achieved by providing three outputs from the different multipaths and combining the three outputs into one, e.g., using MRC.

According to an embodiment of the method of the invention, a single, common correlation filter (CF) designs provided in a wireless system using CDMA. A plurality of channels with different data rates are provided in the wireless system. The channels provided in the wireless system include the access channel, the maintenance channel, and the traffic channel in which information (e.g., pilot or data symbols or both) is transmitted at the tier 1, tier 2 and tier 3 rates. The data rate for transmitting the information is programmable by the digital signal processor (DSP). A user-unique code, such as a PN code, is applied to the information being transmitted in the channels of the wireless system. The information is QPSK modulated and transmitted in any one of the channels and at any data rate. The transmitted information is correlated at the smallest data rate (i.e., the tier 1 rate) using time multiplexing in the correlation filter (CF) of the wireless system. The correlated information is then demultiplexed and QPSK-demodulated. The demodulated information is summed at the proper integer multiple of the tier 1 rate to achieve the tier 2 and tier 3 rates if needed. The three strongest multipaths (in terms of the received power) are selected in a window or time period for optimal information recovery. Furthermore, three outputs from the demodulated information can be provided and combined for temporal diversity. Spatial diversity is achieved by providing the single, common correlation filter design in a plurality of receivers in the wireless system. All the process steps according to the invention described herein are advantageously accomplished using a single, common correlation filter (CF) design, which eliminates the need for additional correlators or correlation filters for processing received information having multiple data rates.

BRIEF DESCRIPTION OF THE DRAWINGS

These and other features, aspects, and advantages of the invention will become more readily apparent with reference to the following detailed description of a presently preferred, but nonetheless illustrative, embodiment when read in conjunction with the accompanying drawings. In the accompanying drawings:

FIGS. 6A and 6B show diagrams illustrating the gain coefficient setting of an accumulating filtering random access memory (AFRAM) and a magnitude accumulating filtering random access memory (MAFRAM) for three different data rates in an embodiment according to the invention;

FIG. 6C is a diagram illustrating the basic structure of an embodiment of the AFRAM and MAFRAM according to the invention;

DETAILED DESCRIPTION OF THE PREFERRED EMBODIMENTS

Figure 1:
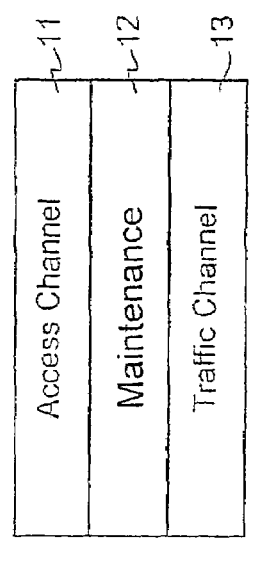
FIG. 1 is a diagram generally illustrating a transmitter and a receiver in the reverse link in accordance with the invention.
Figure 1:
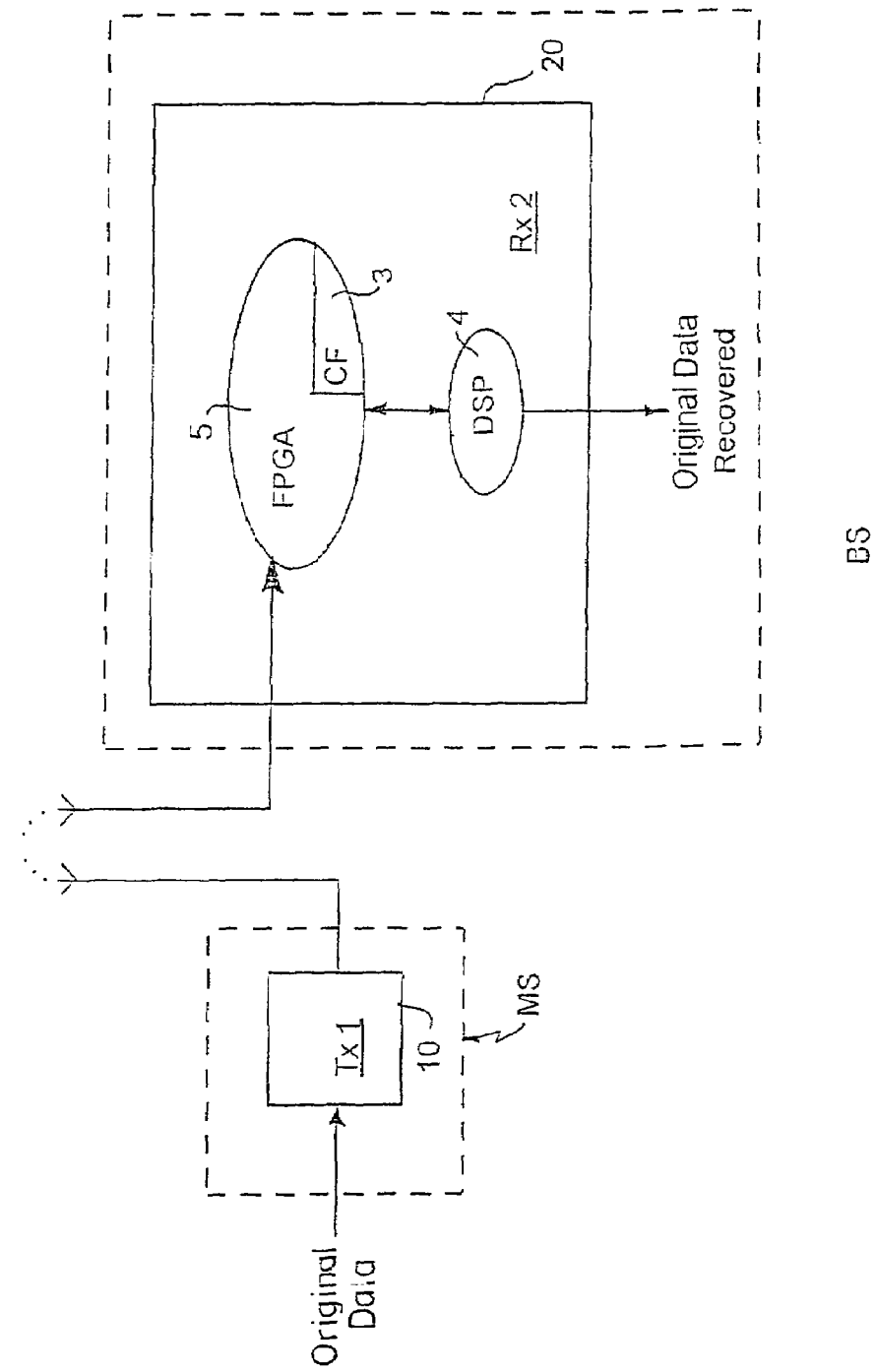

Turning to FIG. 1, a transmitter 10 and a receiver 20 communicate over the reverse link in an exemplary wireless system according to the invention. In FIG. 1, transmitter 10, Tx 1, is a part of a mobile station (MS) or mobile cellular phone communicating with receive 20, Rx 2, which is part of a base station (BS). Digital information at a basic data rate is coded or spread to a transmit data rate (or chip rate) at transmitter 10. A user-unique digital code (the signature or spreading sequence) is applied to the digital information being transmitted, which increases the bandwidth. The application of the digital code, such as a pseudorandom noise (PN) code, typically involves multiplication or logical XOR (exclusive-or) operations on the digital information being transmitted with the PN code. The resulting transmitted data sequences or chips are then QPSK modulated at transmitter 10 to generate an output signal. The output signal is added to other similarly processed output signals for multi-channel transmission to the receiver 20 over a communications medium. The output signals of multiple users advantageously share a single transmission communications frequency, with the multiple signals appearing to be located on top of each other in both the frequency domain and the time domain. Because the applied digital codes are orthogonal and user unique, each output signal transmitted over the shared communications frequency is similarly unique, and can be distinguished from each other through the application of proper processing techniques at receiver 20.

The receiver 20, comprises a correlation filter CF 3 formed by a field programmable gate array FPGA 5 and a digital signal processor DSP 4. In receiver 20, the received signals are QPSK-demodulated and the appropriate digital code for the user of interest is applied to (i.e., multiplied with) the signal to despread and remove the coding from the desired transmitted signal, and to return it to the basic data rate. Where the digital code (i.e., PN code) is applied to other transmitted and received signals, there is no despreading as the signals maintain their chip rate.

This despreading operation effectively comprises a correlation process comparing the received signal with the appropriate digital code. In accordance with QPSK, the transmitted data sequences or chips include an in-phase component (I) and a quadrature phase component (Q), which are the real and imaginary parts of a complex signal. The despreading operation performed by receiver 20 correlates the I and Q components of the received complex signal to the appropriate digital code or signature sequence. This is accomplished using a single correlation filter design (e.g., CF 3) for all data rates in the channels of the wireless system.

In a preferred embodiment of the invention, the exemplary wireless system provides an access channel 11, a maintenance channel 12, and a traffic channel 13 in the reverse link. The correlation filter CF 3 is DSP programmable (i.e., controlled by DSP 4) and can be configured to perform the digital signal processing needed in receiving data from any of the three channels 11, 12 and 13 and at all user data rates. After processing in the correlation filter CF 3 and digital signal processor 4, the original data from the transmitter 10, is recovered. The system and the various embodiments according to the invention are described in further detail below.

Figure 2:
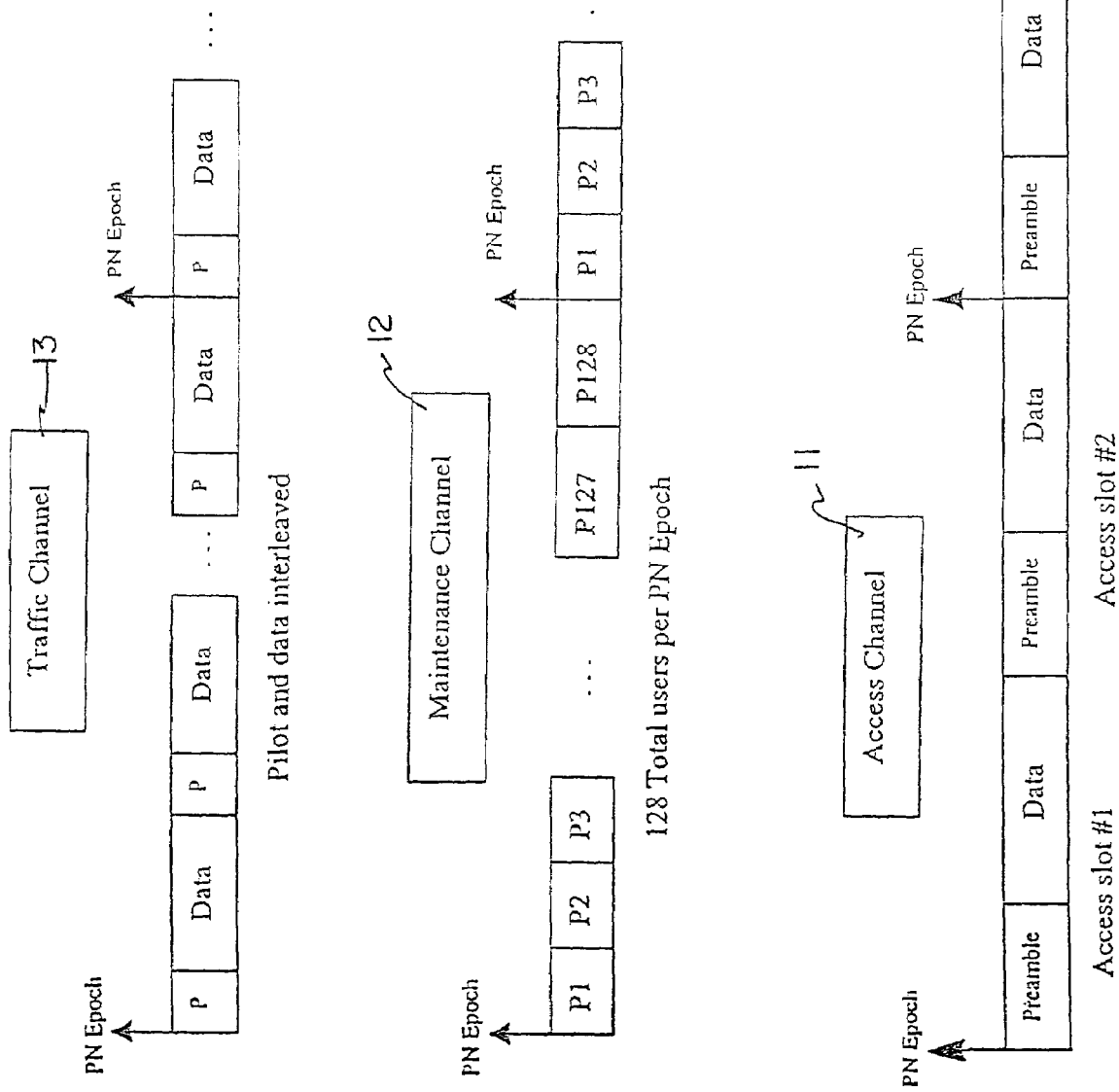
FIG. 2 is a diagram illustrating the structure of a frame of data/pilot symbols being transmitted in various channels in an embodiment according to the invention.

FIG. 2 illustrates the structure of a frame of data/pilot symbols being transmitted in the access, maintenance and traffic channels in an embodiment according to the invention. In this particular embodiment, the access channel (e.g., access channel 11 of FIG. 1) is used by the receiver 20 to communicate with the transmitter 10 when no traffic channel is assigned. The access channel provides a user with a shared data channel for requesting access to the CDMA system. The maintenance channel (e.g., maintenance channel 12 of FIG. 1) maintains the timing of the transmitter and the receiver in the reverse link using a plurality of pilot symbols. No data symbols are transmitted in the maintenance channel. The maintenance channel provides a user with the ability to maintain synchronization with the CDMA system during periods of inactivity. User data and signaling messages (e.g., pilot symbols) from the transmitter are transmitted to the receiver Rx 2 in the traffic channel (e.g., traffic channel 13 of FIG. 1).

The wireless system according to the invention provides three tiers of data rates, i.e., tier 1, tier 2 and tier 3, for use by the channels (access channel 11, maintenance channel 12, and traffic channel 13). At tier 1, the transmitter transmits 8 chips per symbol to the receiver. At tier 2, the transmitter transmits 32 chips per symbol to the receiver in the reverse link. At tier 3, the transmitter transmits 128 chips per symbol in the reverse link of the exemplary wireless system according to the invention. Transmitting data in the access, maintenance and traffic channels is described in further detail below.

When transmitting a frame of data and/or pilot symbols in the reverse link using the access channel, the frame comprises a preamble, succeeded by data, another preamble, and data (FIG. 2). The frame is modulated using QPSK (quadrature phase shift keying), which is known in the art, and channelized (spread) using a unique digital code, such as a pseudorandom noise (PN) code, also known in the art.

When transmitting the modulated frame in the access channel, three access modes of operation for the access channel are provided, namely, the preamble mode, the pilot mode, and the data mode. A PN epoch marks the end of one frame and the beginning of another frame. A preamble of a frame in the access channel comprises a plurality of pilot symbols transmitted at the tier 2 rate (i.e., 32 chips per symbol in the frame). In the preamble mode, pilot symbols only and no data symbols are transmitted. Data, which succeed the preamble in the frame being transmitted in the access channel, comprise a plurality of data symbols and pilot symbols interleaved at the tier 2 rate (i.e., 32 chips per symbol). A mode controller in DSP controls the mode of operation of the access channel and switches between the preamble, pilot and data modes.

When transmitting a frame in the maintenance channel, the frame includes information for multiple users denoted P1, P2, P3, . . . , P128, and no data which is time division multiplexed (TDM) with two pilot symbols per user. The data rate is Tier 3 with 128 chips per symbol (FIG. 2). Only one mode of operation is provided in the maintenance channel, namely, the pilot mode.

When transmitting a frame in the reverse link of the traffic channel, two transmission modes are provided, namely, the pilot mode and the data mode. A frame comprises pilot and data symbols, where the pilot symbols are placed at periodic intervals between the data symbols. The data and pilot symbols may be transmitted at any data rate; transmission at tier 1 rate (i.e., 8 chips per symbol), tier 2 rate (32 chips per symbol) and tier 3 (128 chips per symbol). The data symbols are transmitted at the same rate as that of the pilot symbols.

Similarly, a mode controller in DSP 4 controls the mode of operation of the traffic channel and switches between the pilot mode and the data mode.

Figure 3:
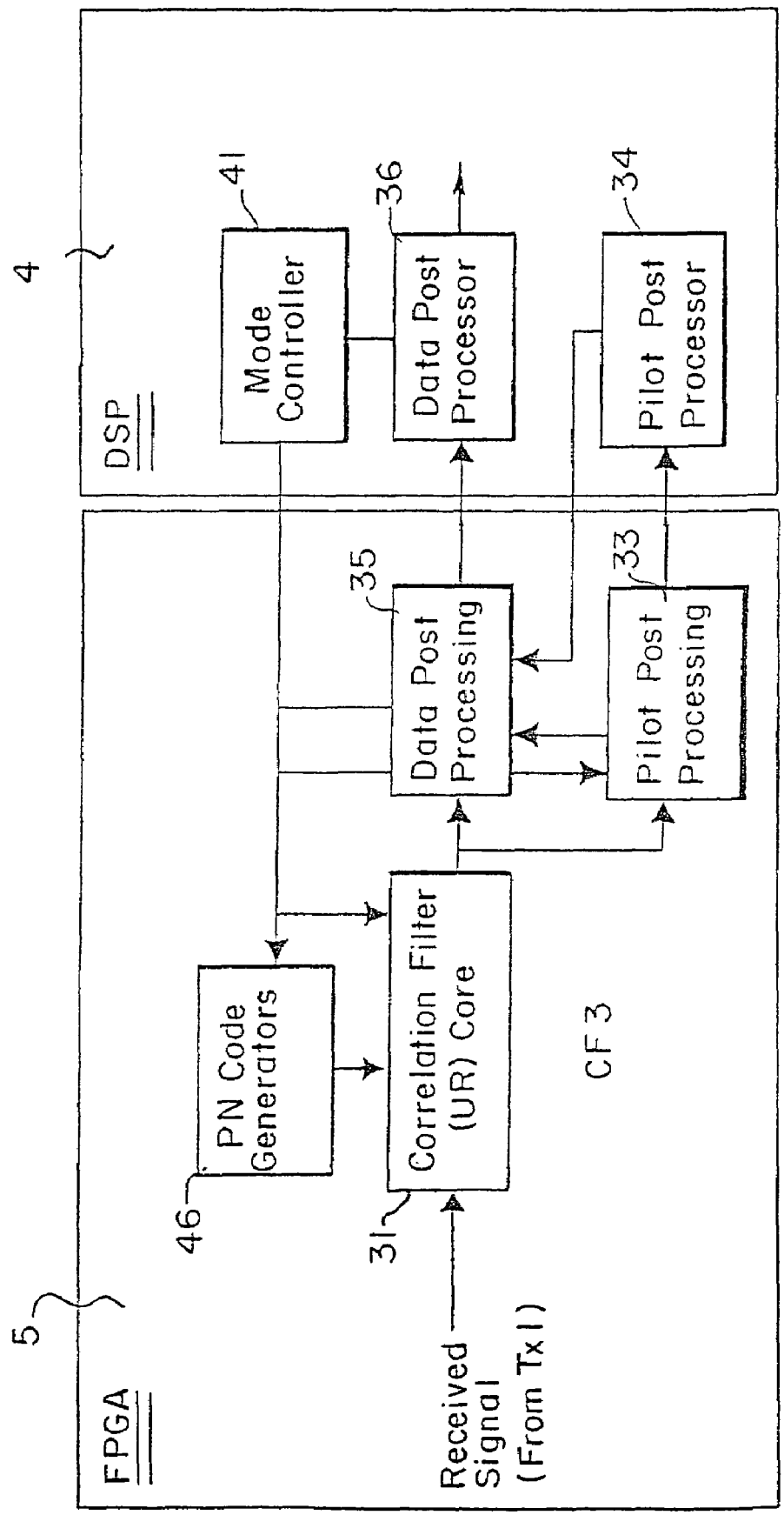
FIG. 3 is a diagram illustrating a receiver with a field programmable gate array (FPGA) forming a correlation filter (CF) according to the invention.

FIG. 3 is a diagram illustrating a receiver with field programmable gate array (FPGA 5) and controlled by a digital signal processor (DSP) 4 according to the invention. The FPGA 5 comprises an FPGA pilot post processor 33, an FPGA data post processor 35, pseudorandom noise (PN) code generator 46, and a correlation filter CF 3 having a CF core 31. The field programmable gate array FPGA 5 with the correlation filter CF 3, and the digital signal processor DSP 4 are included in the receiver 20 to recover the original data transmitted by the transmitter 10. The CF core 31 is used for despreading received data in the three channels (access, maintenance and traffic) 11, 12 and 13. The digital signal processor DSP 4 is used to control and post-process the outputs of the field programmable gate array FPGA. 5.

DSP 4 includes a mode controller 41 which indicates the channel selection (from the access, maintenance and traffic channels) for transmitting data and/or pilot symbols. DSP 4 also includes a pilot DSP post processor 34 and a DSP data post processor 36 which provide pilot symbol-aided QPSK demodulation of the multipaths received at the receiver 20. Pilot symbol aided demodulation is described in the copending U.S. patent application Ser. No. 09/497,440 entitled PILOT SYMBOL ASSISTED MODULATION AND DEMODULATION IN WIRELESS COMMUNICATION SYSTEMS, which is incorporated herein by reference.

Figure 4:
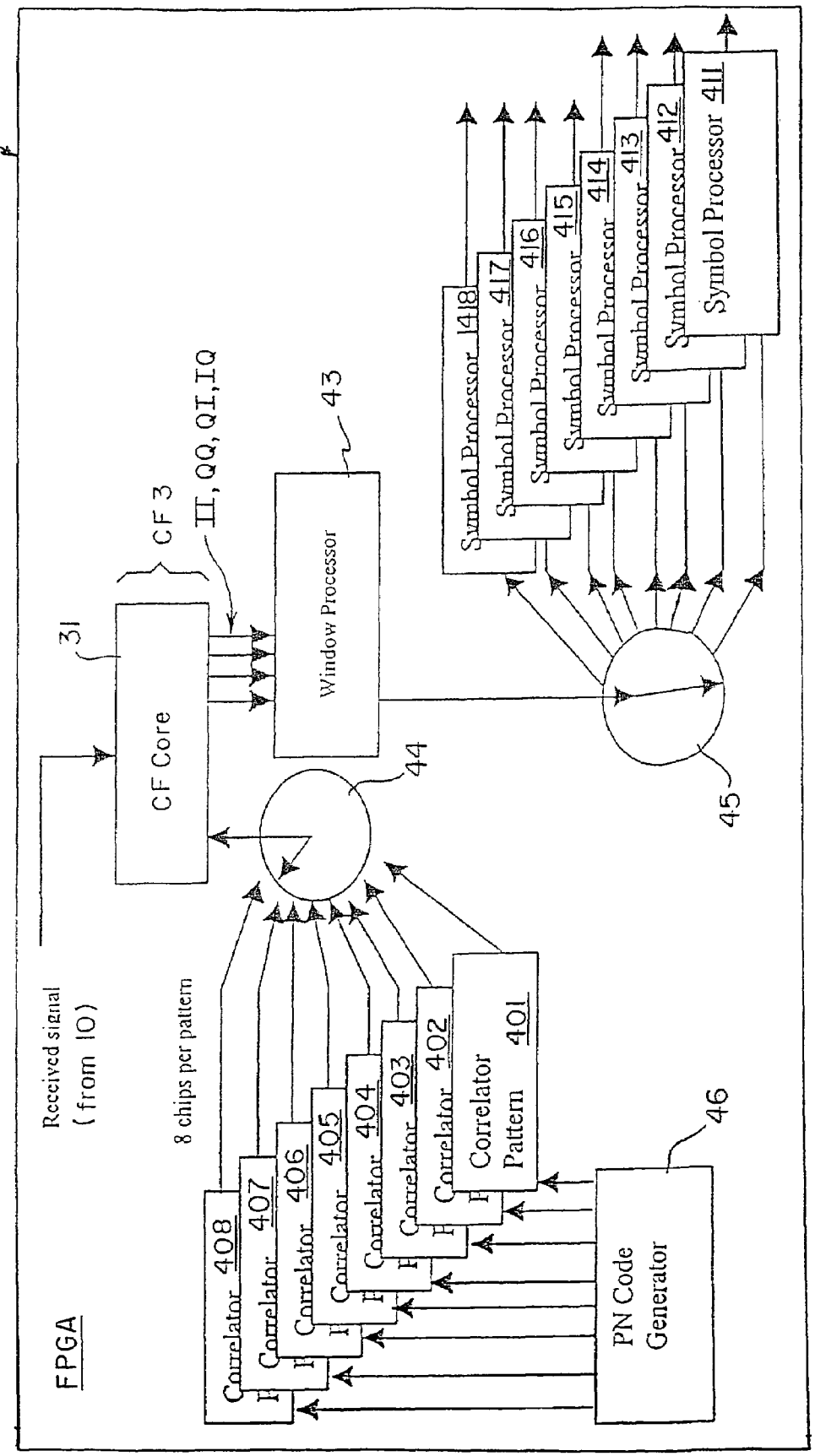
FIG. 4 is a diagram illustrating an exemplary filed programmable gate array forming a correlation filter (CF) core for all channels in the wireless system according to the invention.

FIG. 4 is a diagram that illustrates an exemplary field programmable gate array (FPGA) 5 with a correlation filter (CF) core 31 for all channels in the wireless system according to the invention. The CF core according to the invention performs 8-chip complex correlation with 64 correlation lags, while allowing no data loss as the 64 correlation lags are being processed. A correlation lag is a time instant for which the PN code is held constant, so that the received data in the receiver 20 is correlated based on the PN code and corresponding outputs therefor are generated. Correlation lags are computed independent of the channel type and data rate. This is advantageously achieved with a single time-multiplexed 8-chip correlator engine (i.e., CF core 31) which allows multiple 8-chip correlations to be performed with the same correlation engine. Furthermore, the invention advantageously provides the ability to generate integer multiples of the 8-chip correlation (e.g., 32 or 128 chips) for larger correlation lengths. The operation of the CF core according to the invention is described in further detail below.

As seen in FIG. 4, the field programmable gate array 5 includes a correlation filter CF 3 with a CF core 31, a PN (pseudorandom noise) code generator 46 with correlator pattern buffers 401 through 408, a multiplexer (MUX) 44, a window processor 43, a demultiplexer (DEMUX) 45, and symbol processors 411 through 418. CF core 31 (which is explained in more detail with reference to FIG. 5) is a correlation engine which is a single 8-chip correlation module that provides despreading for all channels (i.e., access, maintenance and traffic channels 11, 12 and 13). CF core 31 is the basic correlation engine which can be used to obtain any x-chip correlation, x being the factor of 8, of the QPSK-modulated frame of data and/or pilot symbols received from the transmitter 10.

PN code generator 46 in the receiver 20 (Rx 2) generates the local PN reference of the PNB code used by the transmitter 10 (Tx 1). PN code generator 46 is DSP programmable and controlled by DSP 4 (FIG. 3) to generate the proper PN code phase. The PN code phase used by each user is established during transmitter-receiver connection setup and remains fixed for the duration of that user's call, i.e., during that connection time to the wireless system.

The PN code phases from the PN code generator 46 are applied to respective correlator patterns 401 through 408. The outputs or the correlator patterns are selectively e.g., sequentially, processed in CF core 31 via the MUX 44. The length of each correlator pattern is 8 chips. In particular, the MUX 44 loads 8 chips of PN reference data of the PN code from one of the correlator patterns into a buffer so that the PN reference can be used by the time multiplexed CF core 31 at the proper time. The 8 chips of the PN code (from respective correlator patterns 401 through 408) are held in the buffer for a period of 64 chips and are used to despread the received data from the transmitter 10. CF core 31 generates a correlation value for each shift of the received waveform from MUX 44 as it passes the PN reference. The time multiplexed CF core 31 allows the generation of multiple correlation lags with a single correlation engine.

Assuming that the modulated frame received from the transmitter 10 is oversampled four times the normal sampling rate set for the system, 256 correlation lags are provided in the 64-chip period. Furthermore, time multiplexing allows a single 8-chip correlator engine (e.g., CF core 31) to provide multiple correlation lags with no loss of data. This process is repeated for the next 8 chips of the PN code.

The correlation core 31 performs a complex correlation. That is, each of the CF core 31 outputs one of four real correlation values. The correlation values are the results of an 8-chip complex correlation which is broken into four real 8-chip correlations in the correlation engine. The result of the four real correlations represents four real multiplications in a complex multiplication, as follows:

$$(a+jb)*(c+jd)=ac-bd+jbc+jad \tag{Eq. 1}$$

where ac=II, bd=QQ, bc=QI and ad=IQ.

The 8-chip complex correlation corresponds to the smallest despreading factor used in the wireless system according to the invention, which is 8 chips for a tier 1 rate. All other data rates in the wireless system are multiples of 8 and can therefore be generated by summing multiple 8-chip correlation outputs. If the number of correlation lags is to be greater than 8 chips (i.e., the PN code is being held constant for more than 8 chips), the next 8-chip time period will have passed and the correlation on the following data will not be properly calculated. As a result, more than one pattern is needed and the number of correlators will be a function of the number of correlation lags needed.

Figure 5:
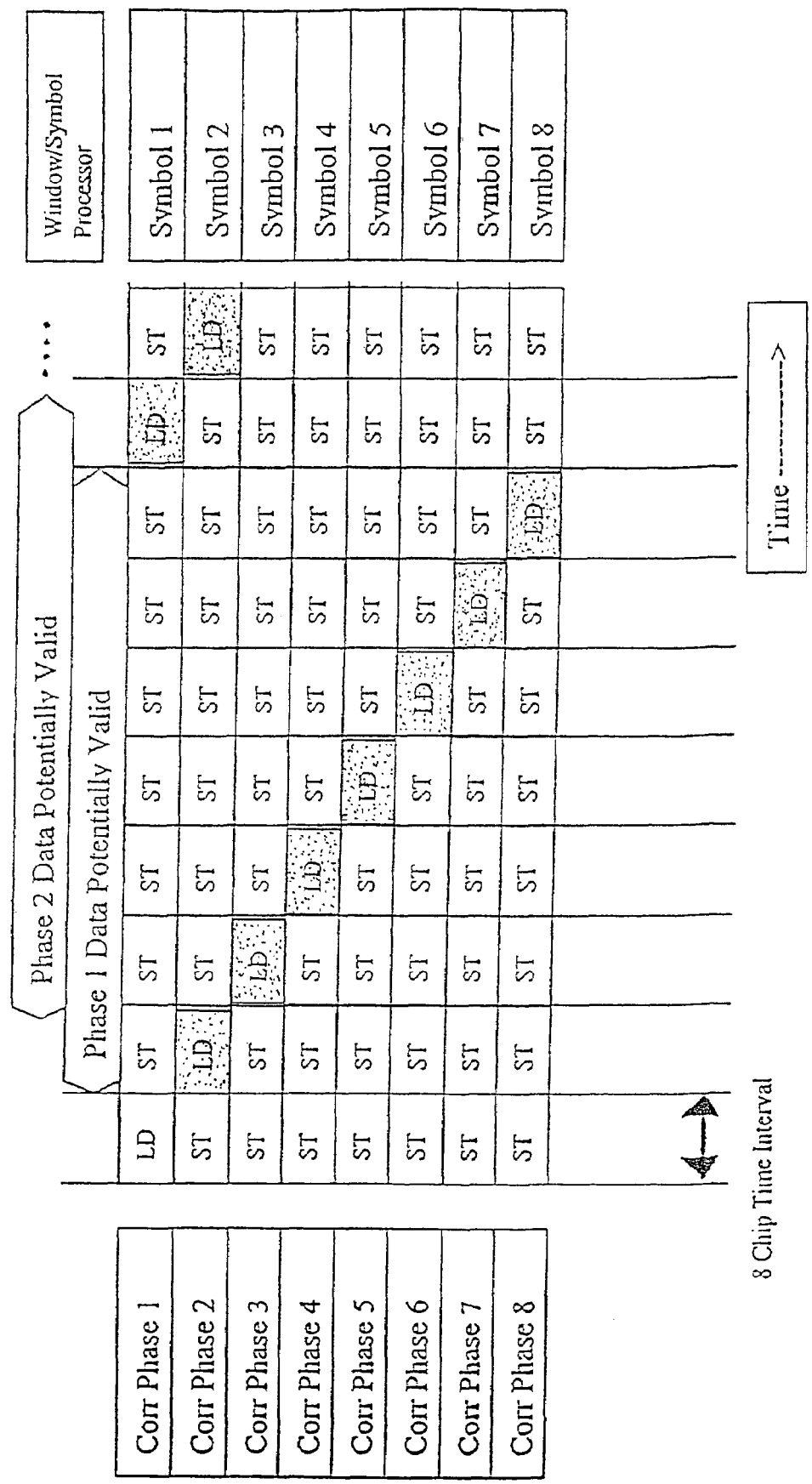
FIG. 5 is a diagram illustrating an exemplary 8-chip correlation with a pseudorandom noise (PN) code according to the invention.

FIG. 5 is a timing diagram illustrating an exemplary time multiplexed, 8-chip complex correlation with a pseudorandom noise (PN) code according to the invention. Since the number of correlation lags in the wireless system according to the invention is established at 64 chips, there is provided a methodology for performing correlations in parallel with time shifting to properly correlate the next 56 chips. As a result, 8-chip time multiplexed correlations are staggered in time by 8 chips. That is, for every 8 chips a new correlation begins while the preceding correlation is still being performed. Therefore, if the correlation output of the 8-chip complex correlation in CF core 31 is to have 64 correlation lags, eight difference 8-chip correlator patterns (e.g., 401-408 of FIG. 4) are processed, each spaced by 8 chips so that no data is missed, as shown in FIG. 5. Each of the eight phases of the correlator pattern (e.g., Corr Phase 1 through 8) is shifted by 8 chips, which is shown by the load notation of LD in FIG. 5. Once the 8 chips of the PN code (e.g., from PN code generator 46) have been loaded, each phase of the correlator pattern produces 64 chips of correlation lag for that set of 8 PN chips in a store operation denoted ST in FIG. 5. To avoid missing the next 56 chips of data, seven other phases of the correlator pattern are set up with the next 56 chips of the PN code and 64 chips of correlation lag calculated for the 8 chips of the PN code. During each correlator phase (e.g., Corr Phase 1 through 8), CF core 31 generates correlation lags for a tier 1 symbol. Each phase of the 64 correlation lags of valid data is shifted in time, as noted in FIG. 5, e.g., Phase 1 Data Potentially Valid, Phase 2 Data Potentially Valid. The 8 chip time multiplexed correlation engine (e.g., CF core 31) produces the 4 real components of a complex correlation for a tier 1 symbol, each having 64 chips of correlation lag. The time multiplexing cycle for CF core 31 is 8 symbols in length, where 8 symbols of tier 1 data are produced per cycle.

The window processor 43 of FIG. 4, the demultiplexer (DEMUX) 45, and the symbol processors 411 through 418 together demodulate the received data from the transmitter 10 using QPSK demodulation. An exemplary QPSK demodulation is described herein and in the copending U.S. patent application Ser. No. 09/497,440 filed on Feb. 3, 2000 and entitled PILOT SYMBOL ASSISTED MODULATION AND DEMODULATION IN WIRELESS COMMUNICATION SYSTEMS. The window processor 43, performs a phase de-rotation of the received signal with a channel estimate from the pilot post-processing (FIG. 3). In particular, the window processor 43 performs complex multiplication of the correlation values corresponding to each Tier 1 symbol from the CF core, and outputs the pilot post processor signal which estimates the channel.

In some embodiments, the DEMUX 45 takes the output of the window processor 43 and produces 64 chips of correlation lag for each tier 1 symbol and routes them to their corresponding symbol processors (411 through 418). There are eight symbol processors (411 through 418), one for each tier 1 symbol that is produced by CF core 31 during the eight phases of the 8-chip complex correlation. The symbol processors (411 through 418) are programmed by DSP 4 to select the proper multipaths from the output of the window processor 43. The symbol processors take the DSP programmable number of correlation lags associated with up to three multipaths, and sum the correlation lags to form three outputs (FIGS. 3 and 4). The outputs from the symbol processors are always at the tier 1 rate from which the DSP 4 can accumulate the outputs to achieve the tier 2 and tier 3 rates. In addition, for the tier 2 rate (32 chips), four outputs from the symbol processors at the tier 1 rate are summed. For the tier 3 rate (128 chips), sixteen outputs from the symbol processors at the tier 1 rate are summed.

Figure 6:
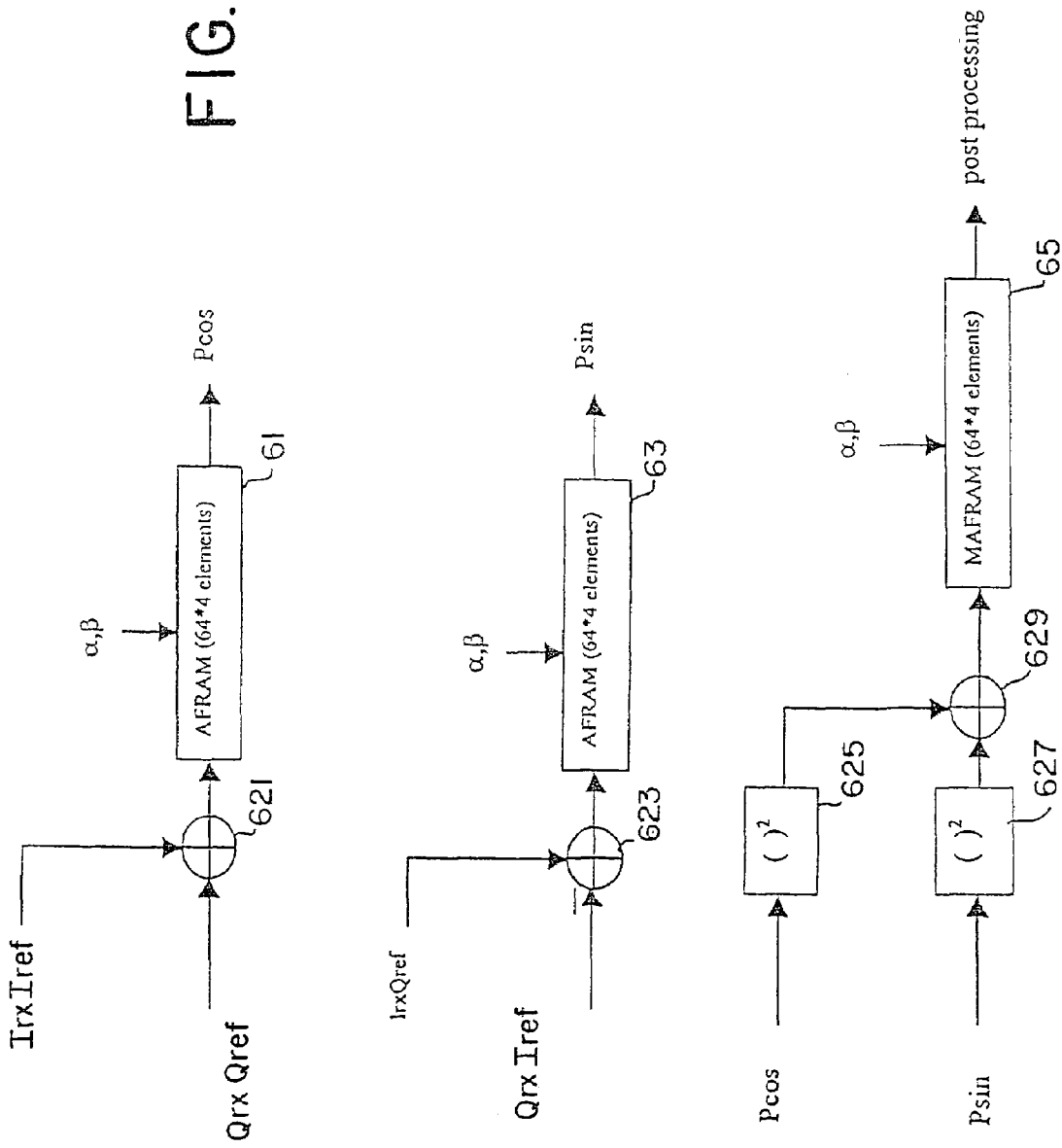
FIG. 6 is a diagram illustrating the pilot post processing of all the channels in an embodiment of the wireless system according to the invention.

FIG. 6 is a diagram illustrating the pilot post processing of any channel of the wireless system according to the invention, namely the access channel, traffic channel and maintenance channel. In each of the three channel types, a portion of the information being transmitted includes pilot symbols. A pilot symbol is a known constant value which the receiver 20 uses to estimate the channel conditions for each received multipath. As the mode controller 41 of DSP 4 (FIG. 3) indicates pilot processing in the access, traffic or maintenance channel, pilot post processor 33 in FPGA 5 of the receiver 20 (Rx 2) starts the processing of the pilot symbols transmitted in the channel. Two accumulating filtering random access memories (AFRAM) 61 and 63 (shown in FIG. 6) having a one-pole infinite impulse response (IIR) filter are provided in pilot post processing 33 for integration of the pilot symbols being transmitted in the channel. Based on the pilot symbols and the IIR filtering thereof, an estimate of the channel is obtained for completing pilot symbol aided QPSK demodulation. Each AFRAM contains 64 correlation lags of IIR-filtered pilot symbols at 4 samples/chip. This allows receiver 20 to have 64 chips of delay-spread range for searching the received multipaths at a resolution of ¼ of a chip time.

AFRAM 61 (and similarly, AFRAM 63) can act as a one-pole IIR filter with coefficients $\alpha$ and $\beta$. An IIR filter, known in the art, is a digital filter that linearly processes sampled data in a recursive manner. That is, an IIR filter samples continuous-time data signals with a fixed periodicity and linearly manipulates and transforms the samples. The one-pole IIR filter has two coefficients, $\alpha$ and $\beta$, which controls and function of the AFRAM. The coefficients ($\alpha$ and $\beta$) are DSP programmable and controlled by DSP 4. Based on the selection of coefficients, the AFRAM (61 or 63) can serve three functions, namely storage (or more particularly, random access memory or RAM), accumulation, and filtering. As a RAM, the AFRAM stores 256 correlation lags of data for a tier 1 pilot symbol. As an accumulator, the AFRAM accumulates correlation data over multiple tier 1 pilot symbols to generate tier 2 or tier 3 data. As a filter, the AFRAM is a one-pole IIR filter that filters data at the tier 1, 2 or 3 data rates for pilot symbol estimation in the presence of noise and interference in the channel. When the $\beta$ coefficient of the IIR filter equals zero, there is no recursive feedback in the IIR filter, i.e., no filtering, and AFRAM 61 (and similarly AFRAM 63) acts as a sample RAM (FIG. 6) for storing the inputs from summer 621 (or summer 623 for AFRAM 63). If the $\beta$ coefficient equals one, AFRAM 61 (and similarly AFRAM 63) acts as a simple accumulator for accumulating the inputs from summer 621 (or summer 623 for AFRAM 63). If the $\beta$ coefficient is between zero and one, then AFRAM 61 (and similarly AFRAM 63) acts as a filter. In effect, by controlling the coefficients (e.g., through DSP 4) the AFRAM 61 (and similarly AFRAM 63) can act as a simple RAM for storing data, an accumulator for accumulating data inputs, or a filter for filtering data signals. This allows the system to process data inputs at any of the tier 1, tier 2 and tier 3 rates, and to integrate the pilot symbols over a time period specified by DSP 4, i.e., multiple-tier pilot symbols at tier 1, tier 2 or tier 3.

FIG. 6 also contains a MAFRAM 65, which is a magnitude accumulating filtering random access memory MAFRAM 65). MAFRAM 65 also includes a one-pole IIR filter containing 64 correlation lags of IIR-filtered pilot symbols. Similar to AFRAM 61 and AFRAM 63, MAFRAM 65 has coefficients a and P and functions as a memory, accumulator and filter. The coefficient are DSP programmable and controlled by DSP 4. MAFRAM 65 serves the three functions similar to the AFRAM (61 or 63) but on the magnitude squared data from the AFRAM. As a RAM, MAFRAM 65 stores 256 correlation lags of data for 1 pilot symbol.

As an example in FIG. 6, in the maintenance channel the pilot symbols are transmitted at the tier 3 rate only. The TDM maintenance channel comprises two pilot symbols, with 128 chips per symbol. The four real correlation outputs, the in-phase and quadrature phase components (I and Q) of the each user's two pilot symbols are stored, accumulated and filtered by AFRAM 61 and AFRAM 63, respectively. The four real correlation outputs are denoted IrxIref, QrxIref, IrxQref and QrxQref. AFRAM 61 and AFRAM 63 respectively process the two I and Q of two symbols (with 128 chips per symbol) at the tier 3 rate. In particular, since the pilot symbols are transmitted in the maintenance channel at a rate larger than the tier 1 rate, AFRAM 61 (and similarly AFRAM 63) accumulates the pilot symbols with filtering. The accumulation is performed by setting the β coefficient of AFRAM 61 (and similarly AFRAM 63) to one. The filtering is accomplished by setting the α and β coefficient of AFRAM 61 (and similarly AFRAM 63) to a value between zero and one. Once the frame is processed, AFRAM 61 (and similarly AFRAM 63) overwrites the old data and stores/accumulates the pilot symbols of the next user being transmitted in the maintenance channel.

After processing in AFRAM 61 and 63, the filtered I and Q (denoted Pcos and Psin, respectively) are squared at squarers 625 and 627, respectively. The squared AFRAM-filtered I and Q components are summed at summer 629, and forwarded to MAFRAM 65 whose output is the post processing signal.

FIGS. 6A and 6B illustrate the α and β coefficient settings of MAFRAM 65, AFRAM 61 and 63 for the tier 1, 2 and 3 data rates. The pilot symbols (denoted P in the Data Type row) are shown alongside the data symbols (denoted D) with corresponding AFRAM and MAFRAM coefficient settings. The α and β coefficient settings illustratively demonstrate the use of the AFRAMs as a RAM, accumulator and filter, and the MAFRAM as a RAM only.

FIG. 6C is a lower level diagram illustrating an embodiment of the AFRAM or MAFRAM according to the invention, e.g., AFRAM 61, 63 or MAFRAM 65 of FIG. 6, which is a basic IIR filter. Information is input into a multiplier 631 where it is multiplied with the α coefficient. RAM 635 is a random access memory that stores 256 elements of information. The stored information from RAM 635 is multiplied with the β coefficient at a multiplier 637. The data multiplied with the gain coefficients α and β are summed at summer 633 and then forwarded to RAM 635 for storage and output.

Referring back to FIG. 6, AFRAM 61, AFRAM 63, MAFRAM 65, together with the time-multiplexed correlation engine (e.g., CF core 31), provide the ability to search for pilot symbols over a 64-chip window. The pilot symbol search is a DSP programmable process for searching the three strongest peaks in the received multipath power profile stored in the MAFRAM. The AFRAM-filtered I and Q values are squared and summed for multipath search processing 67 for selecting the strongest three peaks (in terms of the received power), as described herein and in FIGS. 7 and 7A. Pilot post processor 34 of DSP 4 determines which multipaths are useful for maximum ratio combining to achieve diversity, which is described in further detail below. DSP 4 then forwards the best multipaths to the symbol processors 411 through 418 (FIG. 4) in data post processing circuit 35 (FIG. 3) for pilot symbol aided QPSK demodulation and recovery of the data symbols.

Figure 7:
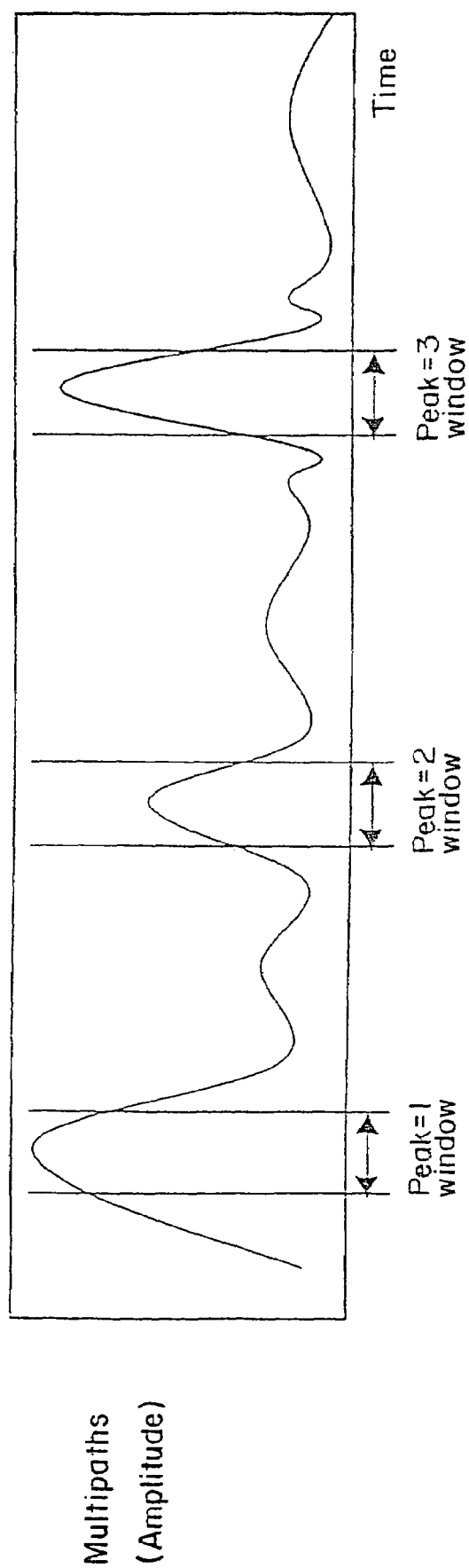
FIG. 7 is a diagram illustrating the multipath search processing of multipath response peaks according to the invention.

FIG. 7 is a diagram illustrating the search processing of the multipath power profile according to the invention. Three peaks 1, 2 and 3 are selected from the 64-chip search window for demodulation. The three strongest peaks (in terms of the received power) are selected by processing a succession of passes through the MAFRAM data. The selection process allows DSP 4 to identify the multipath responses for use in demodulation and recovery of the data symbols. In such a selection process, the strongest peak in the multipath response of the demodulation waveform for the data received from the transmitter is selected and a window (in terms of time or a time period) is assigned thereto. The multipath response is examined again, barring the window for the strongest peak (peak 1), and the second strongest peak is selected and a window is assigned thereto.

The multipath response is examined once more, barring the windows for the strongest peak (peak 1) and the second strongest peak (peak 2), and the third strongest peak (peak 3) is selected and a window is assigned thereto. Upon completion of the selection process, the three peaks 1, 2 and 3 are supplied to digital signal processing DSP 4.

Figure 7A:
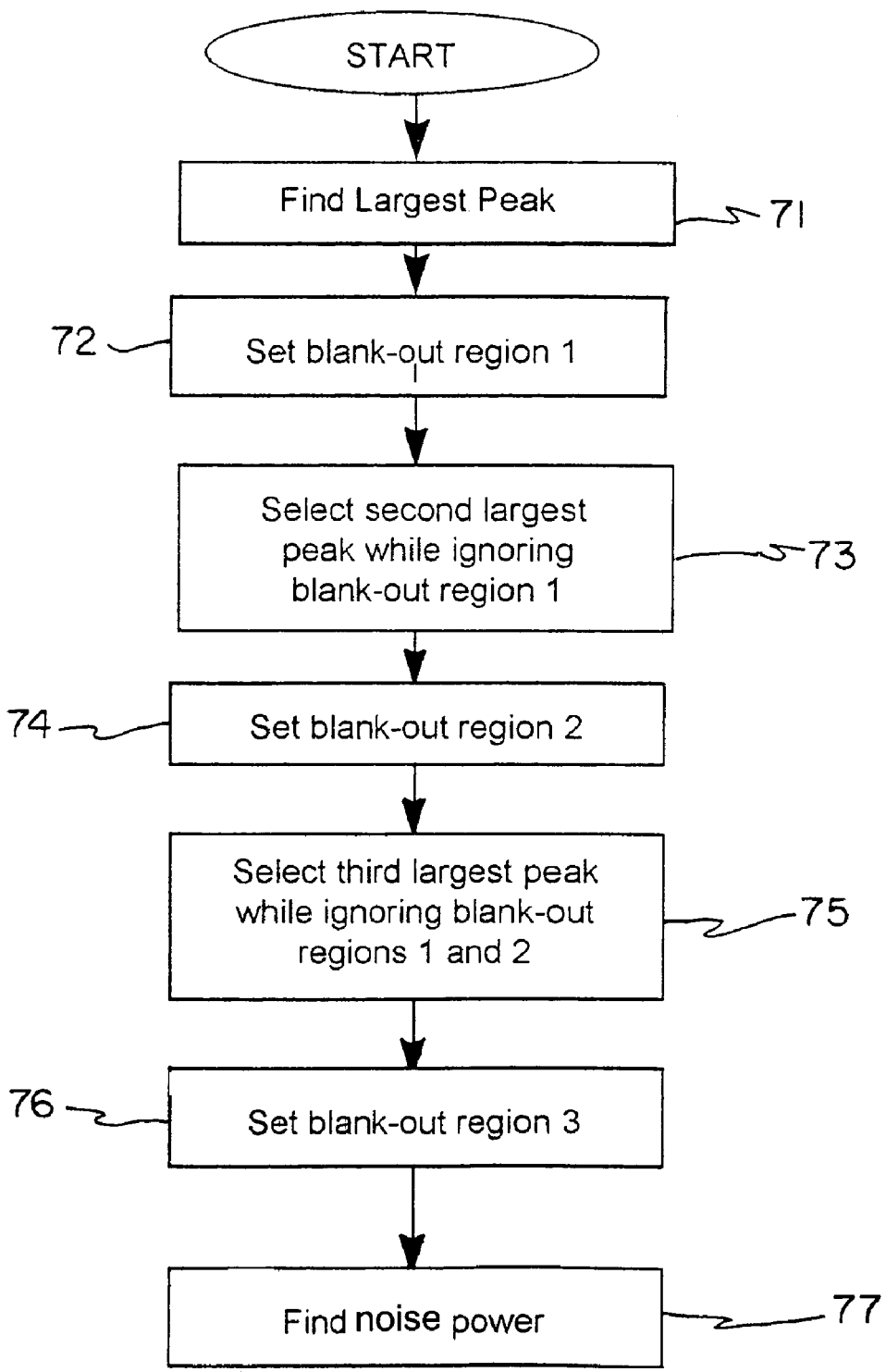
FIG. 7A is a flow diagram illustrating an embodiment of the method of the multipath search processing of multipath response peaks according to the invention.

FIG. 7A is a flow diagram illustrating an embodiment the multipath search processing of the multipath response peaks according to the invention. The summed squares of AFRAM-filtered I and Q are stored in MAFRAM 65 (FIG. 6). The information stored in MAFRAM 65 is used for the multipath search processing in a 64-chip window as shown in FIG. 7. In step 71 of FIG. 7A, the strongest peak in terms of the received power of the multipath response is stored as index 1 and its magnitude stored as max_power 1. In step 72, a blank-out region 1 is set. The blank-out region is ignored for the next examination of the multipath response. In particular, the blank-out region is defined by a lower limit 1 and an upper limit 1, as follows:

$$\text{lower limit 1} = \text{index 1} - \text{window} \quad\quad (\text{Eq. 2})$$

$$\text{upper limit 1} = \text{index 1} + \text{window} \quad\quad (\text{Eq. 3})$$

wherein window denotes the length of the multipath response which should not be searched on the next pass. In step 73, the strongest peak in the multipath response is selected by examining the multipath response, while ignoring the blank-out region 1. In effect, the second strongest peak in the entire multipath response is selected, which is stored as index 2 and its magnitude stored as max_power 2. In step 74, another blank-out region 2 is set with a lower limit 2 and an upper limit 2, as follows:

$$\text{lower limit 2} = \text{index 2} - \text{window} \quad\quad (\text{Eq. 4})$$

$$\text{upper limit 2} = \text{index 2} + \text{window} \quad\quad (\text{Eq. 5})$$

In step 75, the strongest peak in terms of the received power in the multipath response is selected by examining the multipath response while ignoring the blank-out regions 1 and 2. In effect, the third strongest peak in the entire multipath response is selected, which is stored as index 3 and its magnitude is stored as max_power 3. In step 76, an additional blank-out region 3 is set with a lower limit 3 and an upper limit 3 as follows:

$$\text{lower limit 3} = \text{index 3} - \text{window} \quad\quad (\text{Eq. 6})$$

$$\text{upper limit 3} = \text{index 3} + \text{window} \quad\quad (\text{Eq. 7})$$

In step 77, the noise power of the multipath response is stored. The noise power is the sum of all the remaining power in the multipath response. In particular, the noise power is obtained by summing all power elements of the multipath response in the window, while ignoring blank-out regions 1, 2 and 3. The noise power is then reported to DSP 4.

The strongest peaks in terms of the received power in the multipath response and the noise power information in MAFRAM 65 are available to DSP 4 after each pilot symbol is processed. With such information, pilot post processor 34 of DSP 4 determines which multipaths are useful for maximum ratio combining to achieve diversity, which is described in further detail below. DSP 4 then forwards the best multipaths to the symbol processors 411 through 418 (FIG. 4) in data post processor 35 (FIG. 3) for pilot symbol aided QPSK demodulation and recovery of the data symbols.

Figure 8:
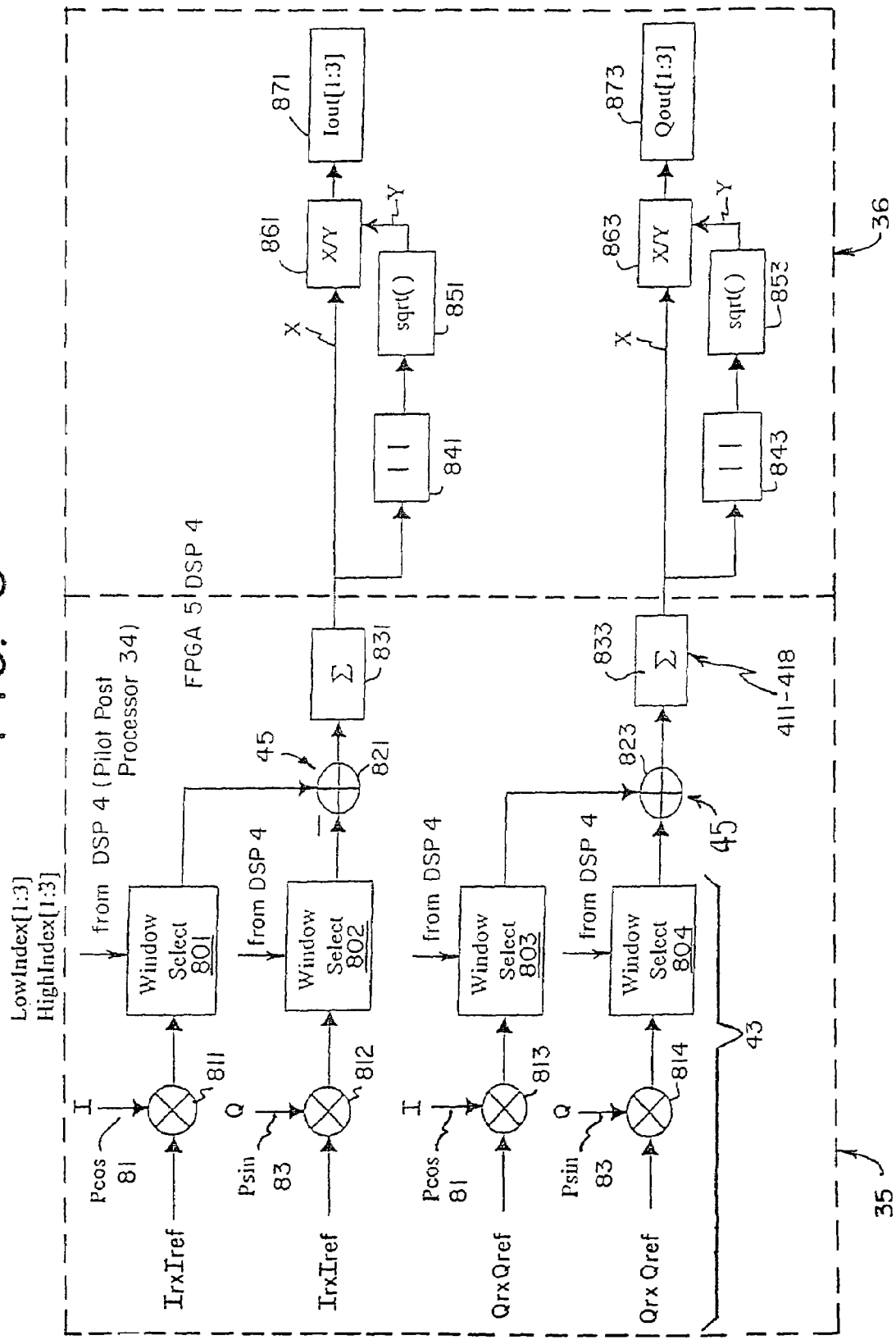
FIG. 8 is a diagram illustrating the data post processing in the channels of the wireless system according to the invention.

FIG. 8 is a diagram illustrating the data post processing in the channels of the wireless system according to the invention and, more particularly, the data post processing in the access channel and the traffic channel. In the data mode of the access channel or the traffic channel, data symbols are then processed at the tier 1 data rate. No data symbols are transmitted in the maintenance channel.

As the mode controller 41 of DSP 4 (FIG. 3) indicates the data mode in the access channel, data symbols are processed at the tier 1 rate. The four PN referenced correlation values, namely Irxlref, QrxQref and IrxQref are respectively input into window processor 43 (FIG. 8 and FIG. 4) comprising multipliers 811, 812, 813 and 814. Window processor 43 performs a complex de-rotation or multiplication of the received correlation values IrxIref, QrxIref, QrxQref and IrxQref with pilot symbol estimates from AFRAM 61, 63, and pilot post processor 33. IrxIref and QrxQref are multiplied with the AFRAM-filtered in-phase component I (e.g., output Pcos 81 from AFRAM 61) and QrxIref and IrxQref are multiplied with the AFRAM-filtered quadrature phase component Q (e.g., output Psin 83 from AFRAM 63). After de-rotation or multiplication of the components, the results are input at window select units 801, 802, 803 and 804, respectively, for the multipath selection based on the pilot search processing in a 64-chip window as described herein and in FIGS. 7 and 7A. This pilot symbol aided demodulation process produces QPSK outputs which are rotated to a QPSK signal constellation.

Due to the time multiplexed structure of the correlation core, the 64 chips of correlation values associated with each tier 1 data symbol are not in the proper order and require time demultiplexing to yield appropriately ordered data symbols. Upon completion of the window selection at circuits 801, 802, 803 and 804, the four real correlations are combined into I and Q at summers 821 and 823 and demultiplexed at DEMUX 45.

After demultiplexing, DEMUX 45 outputs the 64 chips of correlation lag for each tier 1 data symbol to the corresponding symbol processors in circuits 831 and 833. There are eight symbol processors (411 through 418 in circuits 831, 833), one for each tier 1 data symbol produced by CF core 31 during the eight phases of the 8-chip correlation process, described herein and in FIGS. 4 and 5. The symbol processors (411 through 418) of one unit 833 take the DSP programmable number of correlation lags associated with up to three multipaths and sum the correlation lags to form three outputs. The low index (lower limits 1, 2 and/or 3) and high index (upper limits 1, 2 and/or 3) for all three multipaths determine which correlation lags are used in forming the three outputs. DSP 4 performs further integration of the tier 1 data symbols to provide tier 2 and tier 3 data symbols. This is accomplished by summing four tier 1 data symbols to yield one tier 2 data symbol, and summing sixteen tier 1 data symbols to yield one tier 3 data symbol. DSP 4 then uses the three outputs for combining into a single output for signal diversity.

Referring again to FIG. 8, DSP 4 further provides post processing of the data symbols (in data post processor 36) for normalizing the outputs of the symbol processors by taking the square root of the absolute value to yield voltage signals. This normalization is needed because complex de-rotation or multiplication has been performed based on the received power of the pilot symbols in units of signal power. In order to produce proper diversity combining according to maximum ratio combining (MRC) of the three outputs, normalization is required for yielding voltage signals. The absolute values (representing the magnitudes of the received power) are taken at circuits 841 and 843. Then the square root of the signals from absolute value circuits 841, 843 are generated in square root circuits steps 851 and 853. Next, output of the square root circuits 851, 853 is scaled at divider 861 and divider 863, respectively. Using MRC as described herein, the three outputs are then combined in summing circuits 871 and 873 to obtain one output for each of the I and Q components.

Another type of diversity is spatial diversity, where multiple antenna are provided in the transmitter or receiver for transmitting the same data signals which provide the diversity needed for combining or selecting the data signals. Spatial diversity is achieved by providing the same correlation filter design according to the invention in each antenna receiver in the wireless system.

Figure 9:
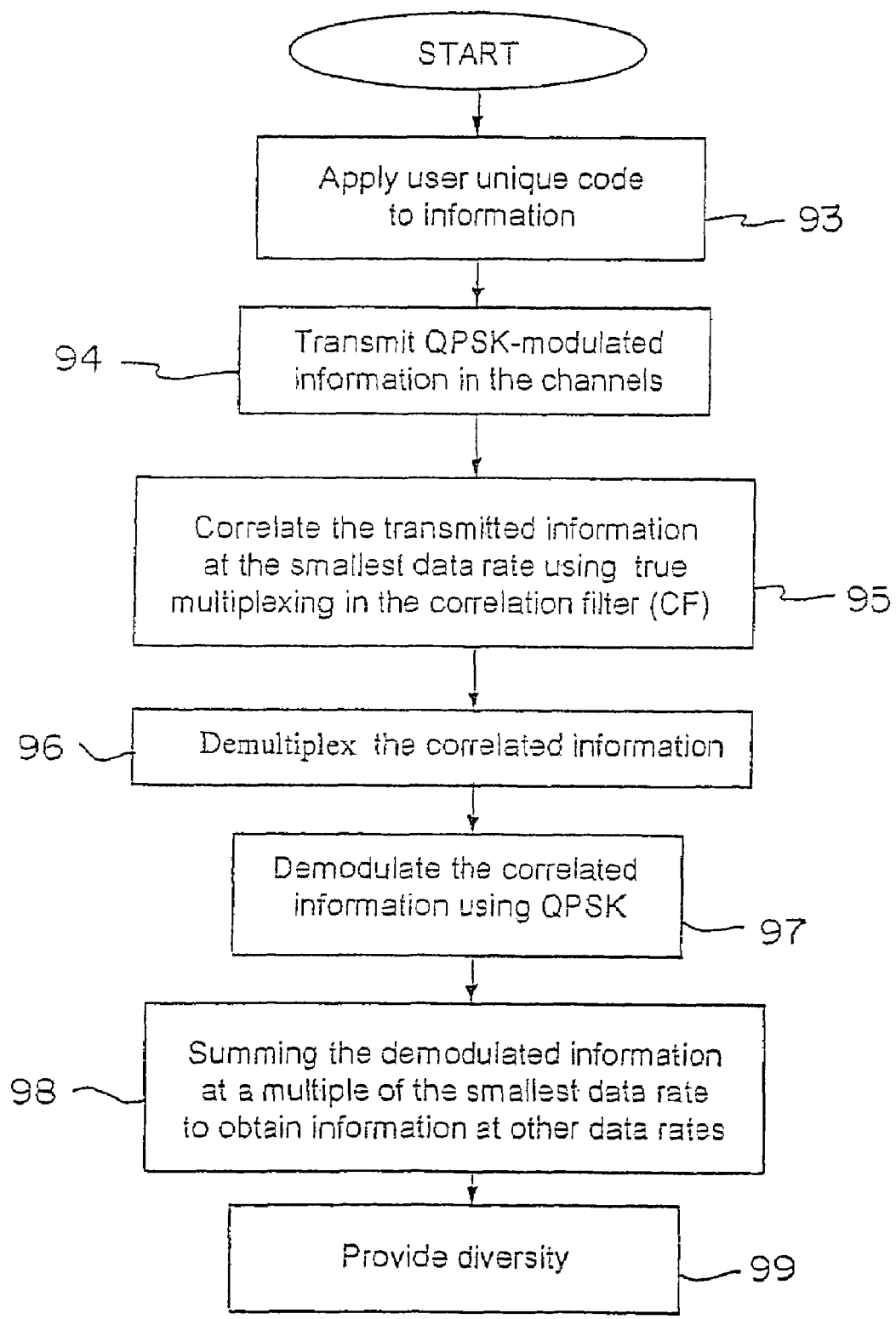
FIG. 9 is a flow diagram illustrating an embodiment of the method of QPSK modulation according to the invention.

FIG. 9 is a flow diagram that illustrates an embodiment of the method according to the invention. This method is carried out in a wireless CDMA system using a single, common correlation filter (CF). The system has a plurality of channels with different data rates and they include the access channel, the maintenance channel, and the traffic channel in which information (e.g., pilot or data symbols or both) is transmitted at the tier 1, tier 2 and tier 3 rates, as described herein in conjunction with FIG. 2. The data rate for transmitting the information is programmable by digital signal processing (DSP). To begin the method a user-unique code, such as a PN code, is applied to the information being transmitted in the channels of the wireless system (step 93). In step 94, the information is correlated at the smallest data rate (i.e., the tier 1 rate) using time multiplexing in the correlation filter (CF) of the wireless system (step 95). The correlated information is then demultiplexed (step 96) and QPSK-demodulated (step 97). The demodulated information is summed (step 98) at the proper integer multiple of the tier 1 rate to achieve the tier 2 and tier 3 rates, as described herein in conjunction with FIG. 4. The three strongest peaks (in terms of the received power) of the multipath response of the information are selected in a window or time period for optimal information recovery, as described herein in conjunction with FIGS. 7 and 7A. Furthermore, in step 99 three outputs from the demodulated information can be provided and combined for temporal diversity, as described herein in conjunction with FIG. 8. All the process steps according to the invention described herein are advantageously accomplished using a single, common correlation filter (CF) which eliminates the need for additional correlators or correlation filters for processing received information having multiple data rates.

Although the invention has been particularly shown and described in detail with reference to the preferred embodiments thereof, the embodiments are not intended to be exhaustive or to limit the invention to the precise forms disclosed herein. It will be understood by those skilled in the art that many modifications in form and detail may be made without departing from the spirit and scope of the invention. Similarly, any process steps described herein may be interchangeable with other steps to achieve substantially the same result. All such modifications are intended to be encompassed within the scope of the invention, which is defined by the following claims and their equivalents.

What is claimed is:

1. In a code division multiple access (CDMA) communications system having a plurality of channels with different data rates, a method comprising the steps of:

receiving modulated information transmitted at an initial spreading rate over a channel correlating sequential segments of the transmitted information, each sequential segment corresponding to a correlation lag, against a plurality of time-multiplexed correlation patterns with a basic spreading factor to generate correlation values over a correlation window;

demodulating for each sequential segment of the transmitted information the correlation values such that:

(i) where the correlated values include correlated pilot segments, selecting multipath peaks in a received multipath power profile from the correlated pilot segments;

(ii) where the correlated values include correlated data segments, selecting correlated data segments that correspond to the selected multipath peaks of the multipath power profile and combining the selected data segments to generate a respective set of outputs; and recovering the transmitted information by summing the set of outputs to generate a combined output.

2. The method of claim 1 wherein the modulating and demodulating steps are performed using QPSK (quadrature phase shift keying).

3. The method of claim 1 wherein the information in any one of the plurality of channels comprises pilot symbols and data symbols interleaved in a specified and known order.

4. The method of claim 1 wherein the selecting correlated data segments is in terms of received power of the multipath power profile based on a channel estimate from pilot symbols inserted into a waveform of the transmitted information.

5. The method of claim 4 wherein the selecting correlated data segments is also based on noise power of the multipath power profile.

6. The method of claim 1 wherein the selecting correlated data segments is according to an assigned time window.

7. The method of claim 1 wherein the selected data segments are combined into the respective set of outputs using maximum ratio combining (MRC).

8. The method of claim 1 wherein any one of the steps of correlating, demodulating and summing is programmable by an external programmable processor.

9. The method of claim 1 wherein any one of the steps of the correlating, demodulating and summing steps is performed in a traffic channel.

10. The method of claim 1 wherein any one of the steps of the correlating, demodulating and summing steps is performed in an access channel.

11. The method of claim 1 wherein any one of the steps of the correlating, demodulating and summing steps is performed in a maintenance channel.

12. The method of claim 1 in which spatial diversity is provided by providing a plurality of antennas at a receiver and providing a single correlation filter at each of the plurality antennas of the receiver of the system.

13. The method of claim 1 further comprising the steps of:

(a) selecting a most desired signal component in terms of received power of a multipath response in a time period;

(b) storing a magnitude of the most desired signal component;

(c) setting a first blank-out region of the most desired signal component defined by a first upper limit and a first lower limit;

(d) selecting a second most desired signal component of the multipath response in the time period by ignoring the first blank-out region;

(e) setting a second blank-out region of the second most desired signal component defined by a second upper limit and a second lower limit; and repeating steps (a), (b), (c), (d) and (e) until the Nth most desired signal component is selected.

14. The method of claim 13 wherein the selecting in steps (a) and (d) are performed in terms of signal-to-noise ratio based on a channel estimate from pilot symbols inserted into a waveform of the transmitted information.

15. The method of claim 13 wherein the selecting in steps (a) and (d) are performed in terms of multipath width based on a channel estimate from pilot symbols inserted into a waveform of the transmitted information.

16. The method of claim 13 wherein the selecting in steps (a) and (d) are performed according to preprogrammed time alignment.

17. The method of claim 13 further comprising the steps of:

setting 1 through N blank-out regions respectively defined by 1 through N upper limits and 1 through N lower limits; and summing all power elements of the multipath response in the time period for noise power estimation, while ignoring all of the blank-out regions.

18. The method of claim 13 wherein the lower and upper limits of each signal component are programmed by an external programmable processor.

19. The method of claim 1 wherein the each of the plurality of time-multiplexed correlation patterns is pseudorandom noise (PN) code.

20. The method of claim 1 wherein the each of the plurality of time-multiplexed correlation patterns is an orthogonal code.

21. The method of claim 1 wherein the each of the plurality of time-multiplexed correlation patterns is a Walsh code.

22. The method of claim 1 wherein the channels comprise an access channel, a maintenance channel, and a traffic channel.

23. The method of claim 1 wherein the basic spreading factor is 8 chips per symbol.

24. A code division multiple access (CDMA) communications system having a plurality of channels with different data rates, the system comprising:

a receiver that receives modulated information transmitted at an initial spreading rate over a channel, characterized in that the receiver comprises:

a code generator that generates a plurality of time-multiplexed correlation patterns with a basic spreading factor;

a correlation filter having a single, common correlation filter core operable with all of the channels with different data rates, said correlation filter core correlating sequential segments of the transmitted information each sequential segment corresponding to a correlation lag, against the plurality of time-multiplexed correlation patterns from the code generator to generate correlation values over a correlation window;

a pilot post processor, where the correlated values for each sequential segment of the transmitted information include correlated pilot segments, the pilot post processor selecting multipath peaks in a received multipath power profile from the correlated pilot segments;

a data post processor, where the correlated values for each sequential segment of the transmitted information include correlated data segments, the data post processor selects correlated data segments that correspond to the selected multipath peaks of the multipath power profile; and a digital signal processor that combines the selected data segments to generate a respective set of outputs at the basic spreading rate and sums the set of outputs to generate a combined output to recover the transmitted information.

25. The system of claim 24 wherein the each of the plurality of time-multiplexed correlation patterns is pseudo-random noise (PN) code.

26. The system of claim 24 wherein the each of the plurality of time-multiplexed correlation patterns is an orthogonal code.

27. The system of claim 24 wherein the each of the plurality of time-multiplexed correlation patterns is a Walsh code.

28. The system of claim 24 wherein the information in any one of the channels comprises pilot symbols and data symbols interleaved in a specified and known order.

29. The system of claim 24 wherein correlated data segment are selected in terms of received power of the multipath power profile.

30. The system of claim 24 wherein temporal diversity is achieved by the digital signal processor combining the selected data segments using maximum ratio combining (MRC).

31. The system of claim 24 wherein the channels comprise an access channel, a maintenance channel, and a traffic channel.

32. The system of claim 24 wherein the basic spreading factor is 8 chips per symbol.

33. The system of claim 24 wherein the basic spreading factor is 4 chips per symbol.

34. The system of claim 24 wherein the correlation filter (CF) core is programmable by a mode controller.

35. The system of claim 24 wherein the correlation of the transmitted information is programmable by the digital signal processor.

36. The system of claim 24 wherein spatial diversity is achieved by providing a plurality of antennas at the receiver and providing the single common correlation filter at each of the plurality of antennas of the receiver in the system.

37. The system of claim 24, wherein the receiver further comprises a time multiplexer for directing the plurality of correlation patterns to the correlation filter core and a time demultiplexer for receiving the correlated data segments of the correlation filter core.

38. The system of 24 wherein said correlation filter core is an 8-chip complex correlation engine which produces that basic spreading rate of 8 chips per symbol.

39. The system of claim 24 wherein said correlation filter core is a 4-chip complex correlation engine which produces the basic spreading rate of 4 chips per symbol.

40. The system of claim 39, wherein the receiver further comprises a window processor receiving the output of the correlation filter core and producing a phase-compensated output using a complex multiplier for all correlation lags for each 4-chip symbol.

41. The system of claim 38, wherein the receiver further comprises a window processor receiving the output of the correlation filter core and producing a phase-compensated output using a complex multiplier for all correlation lags for each 8-chip symbol.

42. The system of claim 24 wherein the pilot post processor further comprises two accumulating filter random access memories (AFRAMs) having an infinite impulse response (IIR) filter, the AFRAMs functionally serving as memory, accumulator and filter.

43. The system of claim 24 wherein the pilot post processor further comprises a magnitude accumulating filter random access memory (MAFRAM) serving as a memory, accumulator and a filter for magnitude squared data from the accumulating filter random access memories (AFRAMs).

44. The system of claim 24, wherein the pilot post processor further comprises a multipath search process that searches for the signal components in terms of received power in a time period.

45. The system of claim 24, wherein the pilot post processor further comprises a multipath search process that searches for the signal components in terms of signal-to-noise ratio in a time period.

46. The system of claim 24, wherein the pilot post processor further comprises a multipath search process that searches for the signal components according to a preprogrammed time alignment.

47. The system of claim 41, said data post processor further comprises symbol processors summing programmable sections of correlation delay and forming two or more outputs, wherein an external programmable processor combines the outputs into one output to achieve temporal diversity.

* * * * *

UNITED STATES PATENT AND TRADEMARK OFFICE
CERTIFICATE OF CORRECTION

PATENT NO. : 7,272,169 B2
APPLICATION NO. : 10/957928
DATED : September 18, 2007
INVENTOR(S) : Rouphael et al.

It is certified that error appears in the above-identified patent and that said Letters Patent is hereby corrected as shown below:

IN THE SPECIFICATION

Column 1, line 36, after the words "user that", delete "broadcast", and insert therefor --broadcasts--.

Column 3, line 58, after the words "filter (CF)", delete "designs" and insert therefor --design is--.

Column 5, line 11, after the word "receive", delete "20" and insert therefor --20--.

Column 10, line 15, after the word "controls", delete "and" and insert therefor --the--.

Column 10, line 44, after "3", insert --rates--.

Column 10, line 47, after the first instance of "MAFRAM", delete "65)." and insert therefor --65.--.

Column 10, line 50, after the word "coefficients", delete "a and P" and insert therefor --$\alpha$ and $\beta$--.

Column 10, line 51, after the word "The", delete "coefficient" and insert therefor --coefficients--.

Column 12, line 7, after the word "embodiment", insert --of--.

UNITED STATES PATENT AND TRADEMARK OFFICE
CERTIFICATE OF CORRECTION

PATENT NO. : 7,272,169 B2
APPLICATION NO. : 10/957928
DATED : September 18, 2007
INVENTOR(S) : Rouphael et al.

It is certified that error appears in the above-identified patent and that said Letters Patent is hereby corrected as shown below:

IN THE SPECIFICATION

Column 13, line 11, after the word "namely", delete "Irx1rf" and insert therefor --IrxIrf--.

Column 14, line 10, before the words "are provided", delete "antenna" and insert therefor --antennas--.

Signed and Sealed this

Twenty-ninth Day of April, 2008

JON W. DUDAS
*Director of the United States Patent and Trademark Office*